US008621863B2

United States Patent
Krätschrner et al.

(10) Patent No.: US 8,621,863 B2
(45) Date of Patent: Jan. 7, 2014

(54) TURBOCHARGER FOR AN INTERNAL COMBUSTION ENGINE OF A MOTOR VEHICLE

(75) Inventors: Stephan Krätschrner, Schwäbisch Gmünd (DE); Wolfram Schmid, Nürtingen (DE); Michael Stiller, Schwaikheim (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 442 days.

(21) Appl. No.: 12/925,546

(22) Filed: Oct. 22, 2010

(65) Prior Publication Data

US 2011/0079009 A1  Apr. 7, 2011

Related U.S. Application Data (63) Continuation-in-part of application No. PCT/EP2009/001834, filed on Apr. 6, 2009.

(30) Foreign Application Priority Data

Apr. 24, 2008 (DE) .......................... 10 2008 020 406

(51) Int. Cl.
F02D 23/00 (2006.01)
(52) U.S. Cl.
USPC ................ 60/602; 60/605; 415/205; 415/151
(58) Field of Classification Search
USPC ...................... 60/602, 605; 415/151, 205, 407
See application file for complete search history.

(56) References Cited

U.S. PATENT DOCUMENTS

| 94,868 | A | * | 9/1869 | Chase ........................... 415/123 |
| 3,355,878 | A | | 12/1967 | Birmann |
| 4,177,006 | A | * | 12/1979 | Nancarrow ..................... 415/151 |
| 4,389,845 | A | * | 6/1983 | Koike ............................. 60/602 |
| 4,512,714 | A | * | 4/1985 | Kaesser ......................... 415/151 |
| 6,073,447 | A | * | 6/2000 | Kawakami et al. ............. 60/602 |
| 7,694,518 | B2 | * | 4/2010 | Whiting et al. ................. 60/602 |
| 8,172,500 | B2 | * | 5/2012 | Fleig et al. ..................... 415/55.3 |
| 8,197,195 | B2 | * | 6/2012 | Lombard et al. ............... 415/158 |
| 8,316,642 | B2 | * | 11/2012 | McEwan et al. ................ 60/612 |
| 2003/0123977 | A1 | | 7/2003 | Bertnik et al. |
| 2003/0230085 | A1 | * | 12/2003 | Sumser et al. .................. 60/602 |
| 2007/0089415 | A1 | | 4/2007 | Shimoakawa et al. |
| 2008/0022679 | A1 | * | 1/2008 | Hara et al. ...................... 60/602 |

FOREIGN PATENT DOCUMENTS

| GB | 2 062 116 | 5/1981 |
| JP | 63088221 | 4/1988 |

* cited by examiner

*Primary Examiner* — Thomas Denion
*Assistant Examiner* — Thomas Olszewski
(74) *Attorney, Agent, or Firm* — Klaus J. Bach (57) ABSTRACT

In a turbocharger for an internal combustion engine of a motor vehicle, comprising a turbine housing having first and second spiral passages, each of which is connected to at least one exhaust gas line of an exhaust train of the internal combustion engine and a turbine wheel disposed within a rotor chamber of the turbine housing and connected to a compressor impeller via a drive shaft for rotation with the impeller, the exhaust gas of the internal combustion engine can be routed through the spiral passages for admission to the turbine wheel via the first and second spiral passages which have different wrap angles around the turbine wheel.

14 Claims, 10 Drawing Sheets

TURBOCHARGER FOR AN INTERNAL COMBUSTION ENGINE OF A MOTOR VEHICLE

This is a Continuation-In-Part Application of pending international patent application PCT/EP2009/001834 filed Apr. 6, 2009 and claiming the priority of German patent application 10 2008 020 406.4 filed Apr. 24, 2008.

BACKGROUND OF THE INVENTION

The invention relates to a turbocharger for an internal combustion engine having a turbine housing with spiral inlet passages coupled to different exhaust gas lines of an exhaust train of the internal combustion engine and to an internal combustion engine, in particular a gasoline and/or diesel engine.

As a result of the continuous tightening of emission limits, such as $NO_x$ and particulate emission limits, turbochargers and supercharged engines are subject to increasingly strict requirements as well. Requirements are for example increasingly stringent with respect to boost pressure provision at high exhaust gas recirculation rates over medium to high load demand ranges of the internal combustion engine, whereby, the turbines of turbochargers are increasingly made smaller geometrically. The high turbine power output demanded of turbochargers is achieved by increasing the banking capability or reducing the absorption capability of the turbines in combination with the respective internal combustion engine. The power output of turbochargers can further be influenced by installing exhaust treatment systems such as particulate filters, catalytic converters or SCR systems into the exhaust train downstream of the turbine. These exhaust treatment system increase the pressure at an exhaust gas outlet of the turbocharger. This in turn reduces a turbine pressure gradient which characterizes the performance of the turbocharger, wherein the turbine pressure gradient can be determined as a quotient of a pressure upstream of the turbine wheel or an exhaust gas inlet of the turbine housing and a pressure downstream of the turbine wheel or an exhaust gas outlet of the turbine housing. For this reason, the size of the turbine has to be further reduced, thereby reducing its efficiency, in order to meet the power demand of the compressor of the turbocharger. Some improvement is provided by turbochargers known from prior art, the turbine housing of which comprise two independently passable spiral passages which are usually asymmetrical, and each of which is coupled to different exhaust gas lines of an exhaust train of the internal combustion engine. The exhaust gas lines themselves are assigned to different cylinders or cylinder groups of the internal combustion engine.

In the design of turbochargers, which are usually defined on the basis of the nominal operating point, the charge exchange side and the consumption side of the internal combustion engine, the lower load and speed range of internal combustion engines in particular can however not be optimized even when using turbochargers with two asymmetrical spiral passages. For this purpose, the cross-section of one spiral passage generally has to be relatively small in order to generate the required exhaust gas flow speeds. The economical sand casting process commonly used for producing the turbine housing is however subject to limits in terms of production engineering, so that only spiral passages with a width of more than 4.5 mm can be produced reliably. In addition, casting is often subject to relatively major variances of 10% or more, which leads to further efficiency losses of the turbocharger.

It is the object of the present invention to provide a turbocharger for an internal combustion engine, or an internal combustion engine fitted with a turbocharger which allows for improved efficiency in a larger operating range while involving production costs which are as low as possible.

SUMMARY OF THE INVENTION

In a turbocharger for an internal combustion engine of a motor vehicle, comprising a turbine housing having first and second spiral passages, each of which is connected to at least one exhaust gas line of an exhaust train of the internal combustion engine and a turbine wheel disposed within a rotor chamber of the turbine housing and connected to a compressor impeller via a drive shaft for rotation with the impeller, the exhaust gas of the internal combustion engine can be routed through the spiral passages for admission to the turbine wheel via the first and second spiral passages which have different wrap angles.

The wrap angles define the areas in degrees in which the spiral passages enclose the locating chamber of the turbine housing. This reduces manufacturing tolerance requirements while improving the efficiency of the internal combustion engine, in particular in the intermediate and lower load and speed ranges. The spiral passage with the smaller wrap angle significantly contributes to an increase in efficiency, in particular in cases of partial admission. In contrast to prior art, the sonic transition of the exhaust gas flow can be generated immediately upstream of the turbine wheel. This reliably prevents the generation of the exhaust gas flow sonic transition in the spiral cross-section of the spiral passage and the occurrence of high flow losses in the downstream outlet region. In addition, the turbocharger according to the invention allows the continued use of low-cost and established sand casting processes, because the production engineering limits of these processes can be observed easily without affecting the efficiency or mechanical stability of the turbocharger housing. In view of the low manufacturing tolerance requirements, alternative low-cost production methods can be used as well.

In an advantageous embodiment of the invention, the first spiral passage has a wrap angle of less than 300°, in particular less than 200° and preferably less than 150°. In other words, the first spiral passage is a partial volute, so that the power requirements of the compressor can be met optimally even in the lower load and speed range of the internal combustion engine.

Further advantages are offered by a design wherein the second spiral passage has a wrap angle of at least 280°, in particular at least 320° and preferably of at least 350°. In other words, the second spiral passage is at least approximately designed as a full volute, with the result that the turbocharger can be operated in the high load and speed ranges of the internal combustion engine and can be subjected to correspondingly large exhaust gas volumes, allowing full admission. In this way, the first spiral passage can further be designed as a so-called lambda flood in order to achieve, by means of its banking capability, the required air/fuel ratio at optimum efficiencies.

In another advantageous embodiment of the invention, the first spiral passage is located in the region of the shaft bearing and the second spiral passage is located in the region of an exhaust gas outlet in the turbine housing. In other words, it is provided that the second spiral passage, which is at least approximately designed as a full volute, is located at the outlet side of the turbine housing, while the first spiral passage designed as a partial volute is located on its bearing side, whereby the efficiency of the turbocharger is further optimized.

Preferably, the first and/or the second spiral passage(s) include(s) a nozzle in the region leading to the locating chamber. Using this nozzle, the narrowest flow cross-section of the respective spiral passage can be placed at a defined position, so that the sonic transition of the exhaust gas flow is generated directly ahead of the turbine wheel. In this way, undesirable flow losses and a related decrease in efficiency can be reliably avoided.

A cross-sectional width of the nozzle preferably is preferably designed in dependence on a limit width set by considerations of production engineering. It may for example be provided that the cross-sectional width of the nozzle is chosen to exceed the limit width achievable in terms of production engineering by such an amount that the manufacturing tolerances of the process used to produce the turbine housing have a minimum effect on the subsequent performance of the turbine side of the turbo charger. It may for example be provided that the cross-sectional width of the nozzle is at least approximately 4.5 mm when using an economical sand casting process, in order to achieve, at the commonly used manufacturing tolerances of ±10%, both an economical and accurate production of the turbine housing and a reliable subsequent operation of the turbocharger.

Further advantages are obtained by providing that an effective cross-section of the nozzle is chosen in dependence on the wrap angle of the spiral passage and/or the cross-sectional width of the nozzle and/or a radius of the nozzle and/or an efficiency of the turbocharger. An effective cross-section defined in this way, wherein flow losses within the spiral passage are already taken into account, facilitates the simple and variable adaptation to different application profiles of the turbocharger while taking account of the desired efficiency.

It has been found to be advantageous if the effective cross-section of the nozzle is determined in accordance with the formula $$A_D = r_D * 2 * \pi * b_D * \sin(\alpha_D) * (\phi_S/360),$$

wherein $A_D$ denotes the effective cross-section of the nozzle, $r_D$ a radius of the nozzle with respect to an axis of rotation of the turbine wheel, $b_D$ the cross-sectional width of the nozzle, $\alpha_D$ an angle between a circumferential speed vector and a radial speed vector of the exhaust gas flow in the cross-section of the nozzle and $\phi_S$ the wrap angle of the respective spiral passage. Such an effective cross-section of the nozzle ensures an optimum geometrical design and thus an optimum efficiency by simply taking relevant factors and operating parameters into account.

In a particular embodiment of the turbocharger according to the invention, a first inlet region of the first spiral passage corresponds to a second inlet region of the second spiral passage. In this way, a small-sized double-flow turbocharger which can be used in internal combustion engines for cars can be obtained. In car applications of the internal combustion engine, this design achieves improved unsteady-state behavior. If the internal combustion engine is used in commercial vehicles, the setting of an exhaust gas recirculation volume can be adjusted by simple means to reduce the emission of nitrogen oxides.

Preferably, a third spiral passage is provided adjacent to the first and second spiral passages, the third spiral passage having a wrap angle corresponding to a full volute. In this way, a very high turbine efficiency combined with an optimum swirl effect and a tailor-made banking pressure in an exhaust gas recirculation line can advantageously be obtained.

To improve efficiency in a wider operating range of the turbocharger, the invention proposes that a guide grid element comprising guide vanes be provided in the region of the first and/or second spiral passage leading into the locating chamber. Such a guide grid element permits the establishment of a pressure increase upstream of the turbine wheel of the turbocharger, whereby the efficiency of the turbocharger is increased even at a low exhaust gas flow rate in the respective spiral passage.

Another advantage is offered by providing that the guide grid element is mounted movably, in particular translationally and/or rotationally, in the turbine housing. Owing to the movable mounting of the guide grid element, the effective flow cross-section of the first or second spiral passage becomes particularly adaptable. It may further be provided that the guide grid element is moved into the respective spiral passage during an engine braking phase of the internal combustion engine, enabling the turbocharger to be used as a so-called "turbo brake". As an alternative or in addition, it may be provided that the guide grid element is moved into or out of the spiral passage in a firing phase of the internal combustion engine, further improving the adaptability of the power output of the turbocharger to the current operating state of the internal combustion engine. For this purpose, an actuator assigned to the guide grid element may for example be coupled to an engine controller, in order to move the guide grid element in response to corresponding control signals.

Further advantages result from the provision of a matrix mounted movably, in particular translationally and/or rotationally, in the turbine housing for the adjustment of a blade height of the guide grid element. With the aid of a matrix of this type, the banking behavior of the respective spiral passage and thus of the turbine as a whole can be varied particularly easily by adjusting the blade height of the guide grid element, thus adapting it to the current operating state of the internal combustion engine.

A blow-off device, in particular a blow-off valve, may be provided upstream of the turbine wheel, by means of which exhaust gas can be guided past the turbine wheel. This allows a fine adjustment of the exhaust gas throughput of the turbocharger turbine.

A further aspect of the invention relates to an internal combustion engine, in particular a gasoline and/or diesel engine, for a motor vehicle, which comprises at least two cylinders or cylinder groups to which are assigned at least two exhaust gas lines, and a turbocharger with a compressor located in an intake train of the internal combustion engine and a turbine located in an exhaust train of the internal combustion engine, wherein the turbine comprises a turbine housing with at least one first and one second spiral passage, each of which is coupled to at least one of the two exhaust gas lines of the exhaust train and through each of which exhaust gas flows independently, and which further comprises a turbine wheel mounted in a locating chamber of the turbine housing, to which exhaust gas of the internal combustion engine routed through the first and second spiral passages can be applied to drive an impeller of the compressor which is coupled thereto for rotation therewith via a bearing shaft. According to the invention, efficiency is improved in a larger operating range of the internal combustion engine while involving minimum manufacturing costs by providing that the first and second spiral passages have different wrap angles. This permits both partial and full circle admission to the turbine, enabling the internal combustion engine to operate more efficiently in the low, intermediate and high operating ranges. Owing to the simple re-arrangement of the design, well-established economical production processes can be maintained.

The emissions of the internal combustion engine are improved by arranging an exhaust gas recirculation system is upstream of the turbine in the exhaust train, by means of which at least part of the exhaust gas from at least one of the exhaust gas lines can be recirculated into the intake train. The exhaust gas recirculation system in particular allows a reduction of nitrogen oxides ($NO_x$) in the combustion of the fuel of the internal combustion engine. Owing to the improved banking capability of the turbocharger, this opens up operating ranges with a positive charge exchange between the exhaust and intake trains of the internal combustion engine irrespective of the high exhaust gas recirculation capability of the system.

The emission values of the internal combustion engine are improved further by providing that an exhaust treatment system, in particular a particulate filter, catalytic converter or SCR system, is provided in the exhaust train downstream of an exhaust gas outlet of the turbine housing. Any back pressure increase of the turbine wheel caused by such an exhaust treatment system can be compensated for advantageously by means of the turbocharger even in the lower or intermediate operating range of the internal combustion engine.

The invention will become more readily apparent from the following description of particular embodiments described below with reference to the accompanying drawings:

DESCRIPTION OF VARIOUS EMBODIMENTS

Figure 1:
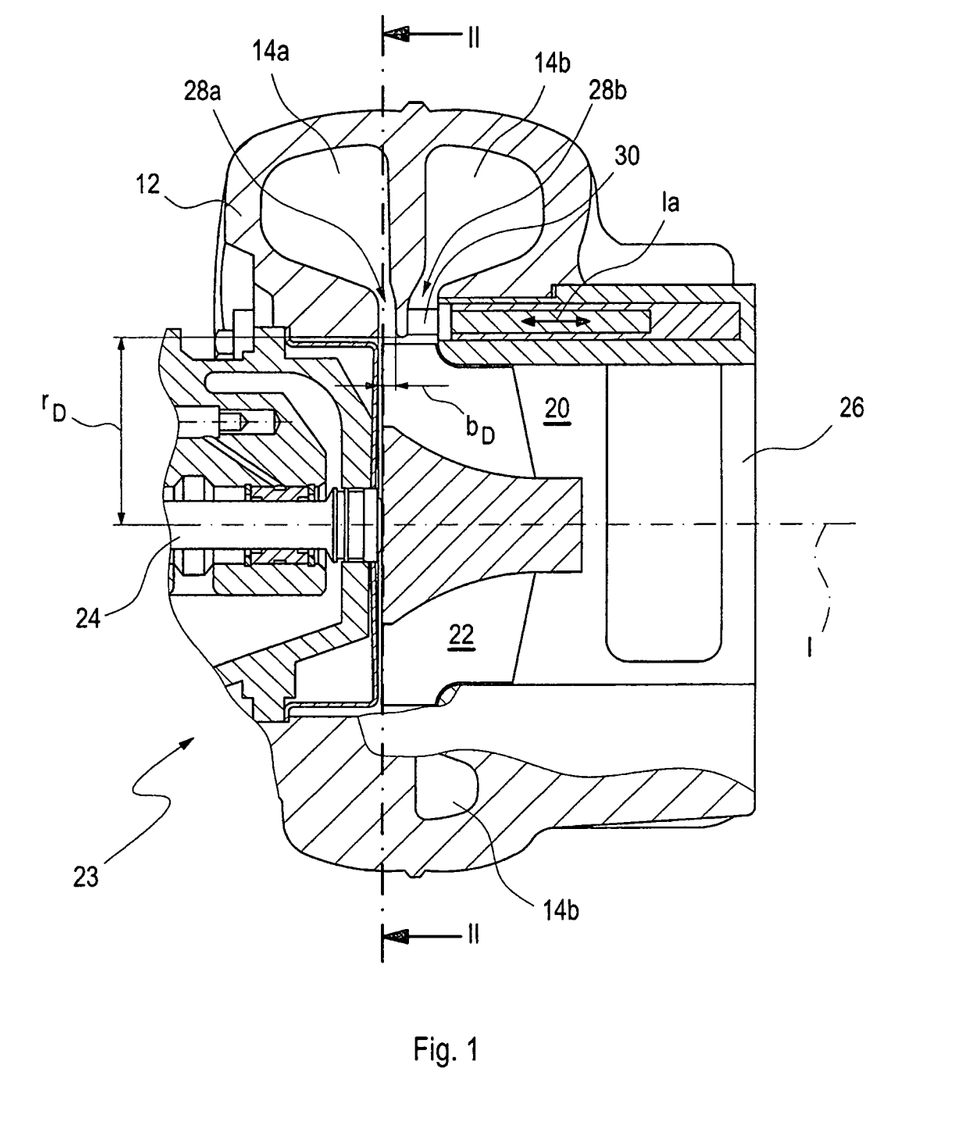
FIG. 1 is a cross-sectional view of a turbocharger according to a first embodiment of the invention.
Figure 2:
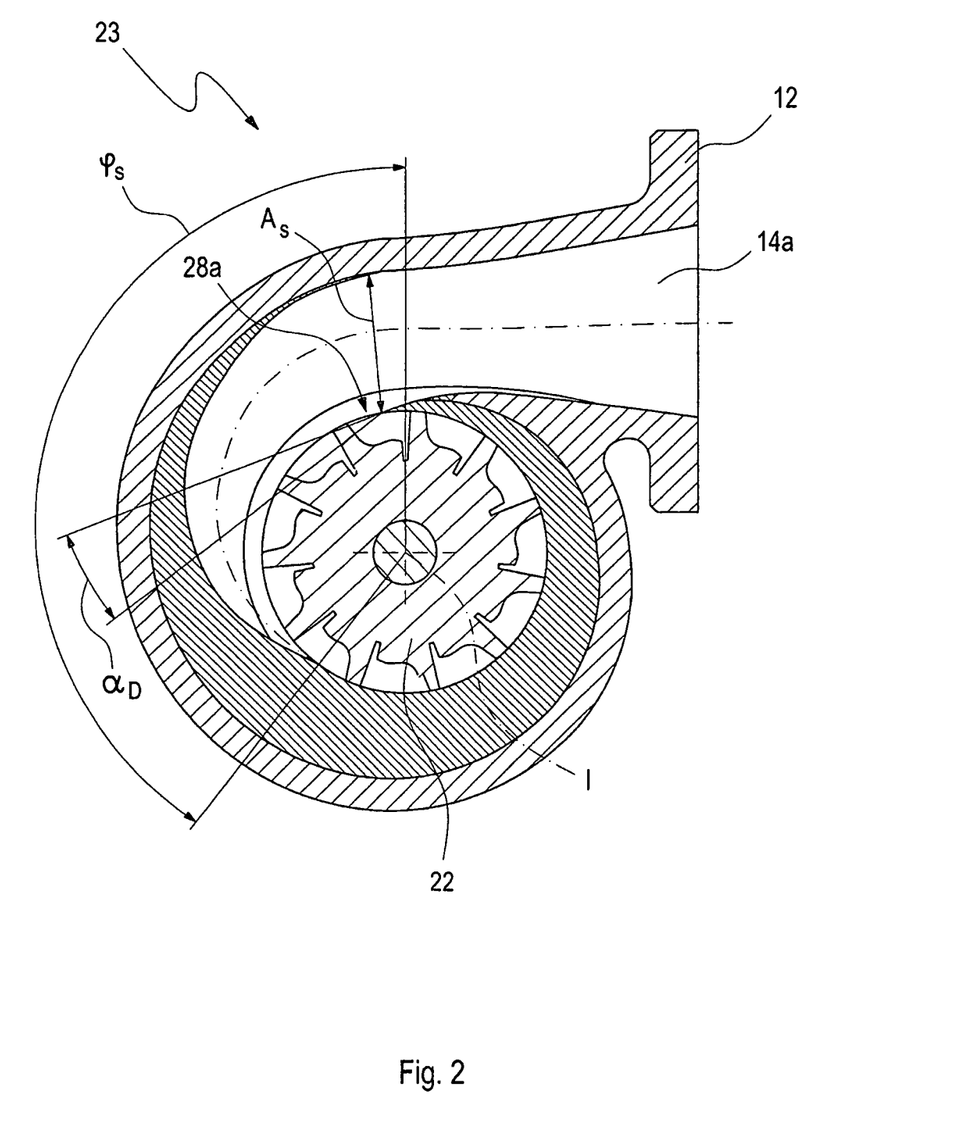
FIG. 2 shows, in a cross-sectional view, taken along plane II-II shown in FIG. 1, a first spiral passage of the turbocharger.
Figure 5:
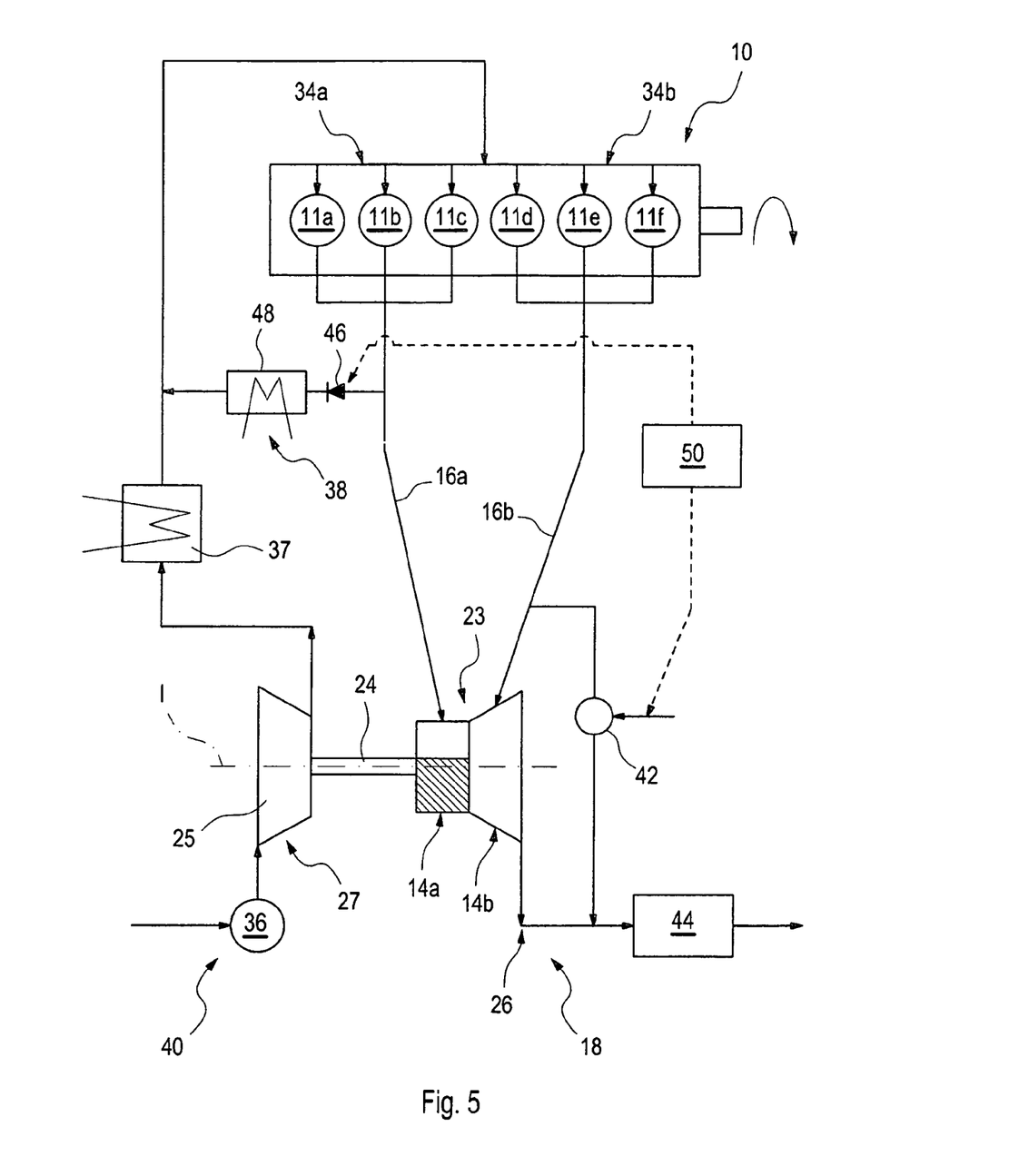
FIG. 5 is a schematic representation of an internal combustion engine fitted with the turbocharger according to the first embodiment.

FIG. 1 is a cross-sectional view of a turbocharger for an internal combustion engine 10 (see FIG. 5) of a motor vehicle according to a first embodiment. The turbocharger comprises a turbine housing 12 with a first and a second spiral passage 14a, 14b, each of which can be coupled to one of several exhaust gas lines 16a, 16b (see FIG. 5) of an exhaust train 18 of the internal combustion engine 10 and through each of which exhaust gas can flow independently. The turbine housing 12 further comprises a turbine wheel 22 in a rotor chamber 20, to which the exhaust gas of the internal combustion engine 10, which can be guided through the two spiral passages 14a, 14b, can be admitted for driving a compressor impeller 25 of a compressor 27 (see FIG. 5) coupled to the turbine wheel 22 for rotation therewith via a drive shaft 24. In order to improve the efficiency of the internal combustion engine 10 in a wider operating range while keeping manufacturing costs as low as possible, the first and second spiral passages 14a, 14b have different wrap angles $\phi_S$. While the second spiral passage 14b, which is located in the region of an exhaust gas outlet 26 of the turbine housing 12, has a wrap angle $\phi_S$ of more than 320°, the first spiral passage 14a, which is located in the region of the drive shaft 24, has a smaller wrap angle $\phi_S$ of approximately 135° (see FIG. 2). In other words, the turbocharger comprises a double-flow turbine 23 with a first spiral passage 14a forming a partial volute and a second spiral passage 14b forming an at least approximately full volute for guiding the exhaust gas flow. In this way, the narrowest flow cross-section of the turbine 23 can is in the area of a nozzle 28a or 28b, so that the sonic transition of the exhaust gas flow is formed directly upstream of the turbine wheel 22 and not in the cross-section $A_S$ (see FIG. 2) of the respective spiral passage 14a, 14b. The nozzles 28a, 28b, which have the smallest cross-sectional widths by of the two spiral passages 14a, 14b, are located in the region leading to the rotor chamber 20. The cross-sectional width $b_D$ of the smaller nozzle 28a is chosen in dependence on a production engineering limit width of an economical sand casting process used to produce the turbine housing 12 and is at least 4.5 mm, in order to achieve, at the commonly used manufacturing tolerances of ±10%, both an economical and secure production of the turbine housing 12 and a reliable subsequent operation of the turbocharger. An effective cross-section $A_D$ of the nozzle 28a is defined by the formula $$A_D = r_D * 2 * \pi * b_D * \sin(\alpha_D) * (\phi_S/360),$$

wherein $r_D$ denotes a radius of the nozzle 28a with respect to an axis of rotation I of the turbine wheel 22 and $\alpha_D$ denotes an angle between a circumferential speed vector and a radial speed vector of an exhaust gas flow in the cross-section of the nozzle 28a (see FIG. 2). In other words, the effective flow cross-section of the nozzle 28a is chosen while taking into account the wrap angle $\phi_S$, the cross-sectional width by of the nozzle 28a, which is determined by the achievable manufacturing tolerances, and the desired turbine efficiency. The turbocharger further comprises a known guide grid element 30 with a plurality of guide vanes, which can be axially pushed into or out of the nozzle 28b of the second spiral passage 14b, among other considerations to represent a turbo braking functionality ("turbo brake") of the turbocharger.

FIG. 2 is a diagrammatic part section of the first spiral passage 14a according to the intersecting plane II-II shown in FIG. 1. In particular, it shows the wrap angle $\phi_S$ of approximately 135°, which is less than that of a full volute, the angle $\alpha_D$ and the cross-section $A_S$ of the spiral passage 14a.

Figure 3:
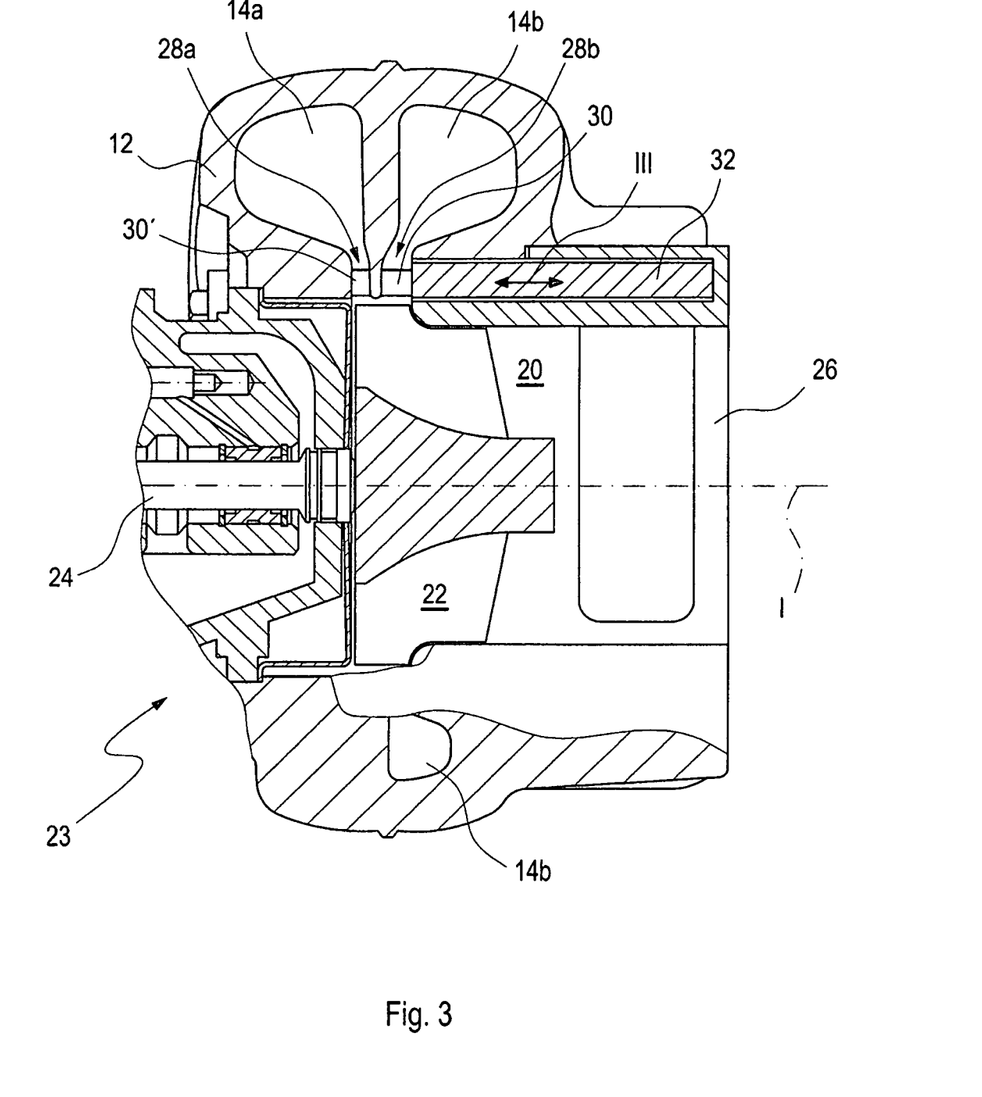
FIG. 3 shows, in a cross-sectional view of the turbocharger according to a further embodiment, the matrix for adjusting the blade height of a fixed guide grid element of a second spiral passage.
Figure 4:
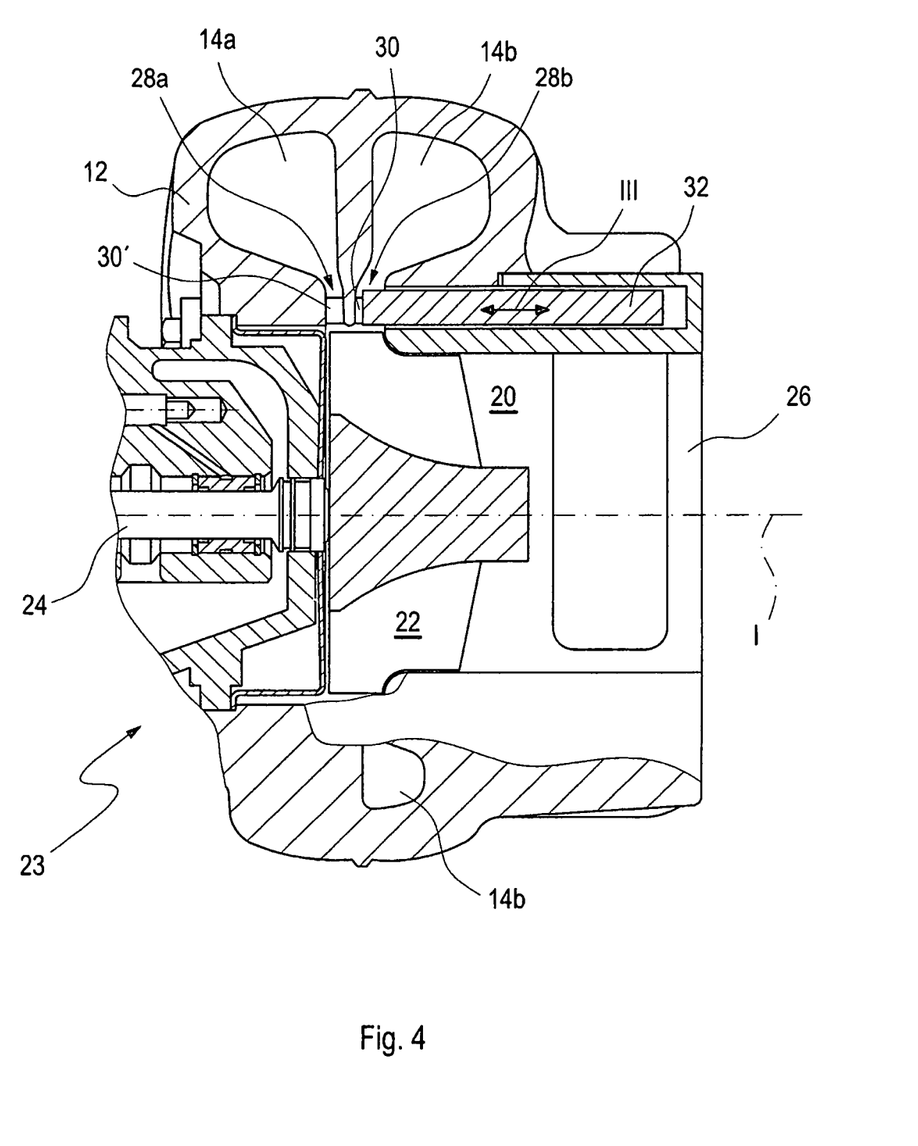
FIG. 4 is a cross-sectional view of the turbocharger shown in FIG. 3, wherein the matrix for adjusting the blade height is moved into a flow area of the second spiral passage.

FIG. 3 is a diagrammatic part section of the turbocharger according to a further embodiment. The basic structure can be derived from the above descriptions. In contrast to the first embodiment, however, the guide grid element 30 is stationary. In addition, a matrix 32 is provided, which is axially movable in the direction of the double-headed arrow II in the turbine housing 12 for the adjustment of a blade height and therefore of a banking behavior of the guide grid element 30.

in FIG. 3, the matrix 32 has been moved out of the flow area of the second spiral passage 14b, while it has largely been pushed into the flow area in FIG. 4. In this way, the banking behavior of the turbine 23 becomes infinitely variable. FIGS. 3 and 4 further show an optional second guide grid element 30', which is located stationary in the region of the nozzle 28a of the first spiral passage 14a.

FIG. 5 is a schematic representation of an internal combustion engine 10 fitted with the turbocharger according to the first embodiment. In principle, the internal combustion engine may be a diesel, an SI or a diesel/SI engine; in the illustrated embodiment, it has six cylinders 11a-f, of which cylinders 11a-c are combined to form a first cylinder group 34a and cylinders 11d-f are combined to form a second cylinder group 34b. The two exhaust gas lines 16a, 16b are assigned to the cylinder groups 34a, 34b, the first exhaust gas line 16a being coupled to the first spiral passage 14a of the turbocharger, which is designed as a partial volute, via suitable manifolds, while the second exhaust gas line 16b is coupled to the second spiral passage 14b designed as a full volute. Upstream of the first spiral passage 14a, the exhaust train 18 is provided with an exhaust gas recirculation system 38, by means of which at least a part of the exhaust gas is conveyed from the exhaust gas line 16a into an intake train 40. The intake train 40 comprises an air filter 36 and an intercooler 37 downstream of the compressor impeller 25. The exhaust gas recirculation system 38 comprises an exhaust gas recirculation valve 46 and an EGR cooler 48 for reducing the exhaust gas temperature.

Upstream of the turbine wheel 22, the second exhaust gas line 16b is coupled to a blow-off device 42, by means of which exhaust gas can be conducted past the turbine wheel 22. In principle, the blow-off device 42 may be integrated into the turbine housing 12 of the turbocharger, or it may be designed as a separate component. Downstream of the exhaust gas outlet 26 of the turbine housing 12, the exhaust train 18 contains an exhaust treatment system 44, which may be a particulate filter, a catalytic converter and/or an SCR system, depending on the design of the internal combustion engine 10. The second spiral passage 14b designed as a full volute, which is also referred to as a lambda guide duct structures, provides, by means of its banking capability, for the required air/fuel ratio with the aim of achieving optimum turbine efficiency. With the turbocharger, a positive charge exchange $p_2$-$p_3'$ can be achieved by means of the second cylinder group 34b in active connection with the second spiral passage 14b. The utilization of the asymmetrical turbine 23 opens up operating ranges for the internal combustion engine 10 in which a positive charge exchange is achieved irrespective of a high exhaust gas recirculation capability. To control its many functions, the internal combustion engine 10 is provided with a control system 50. The exhaust gas recirculation valve 46 and the blow-off device 42 in particular can be controlled by the control system 50.

Figure 6:
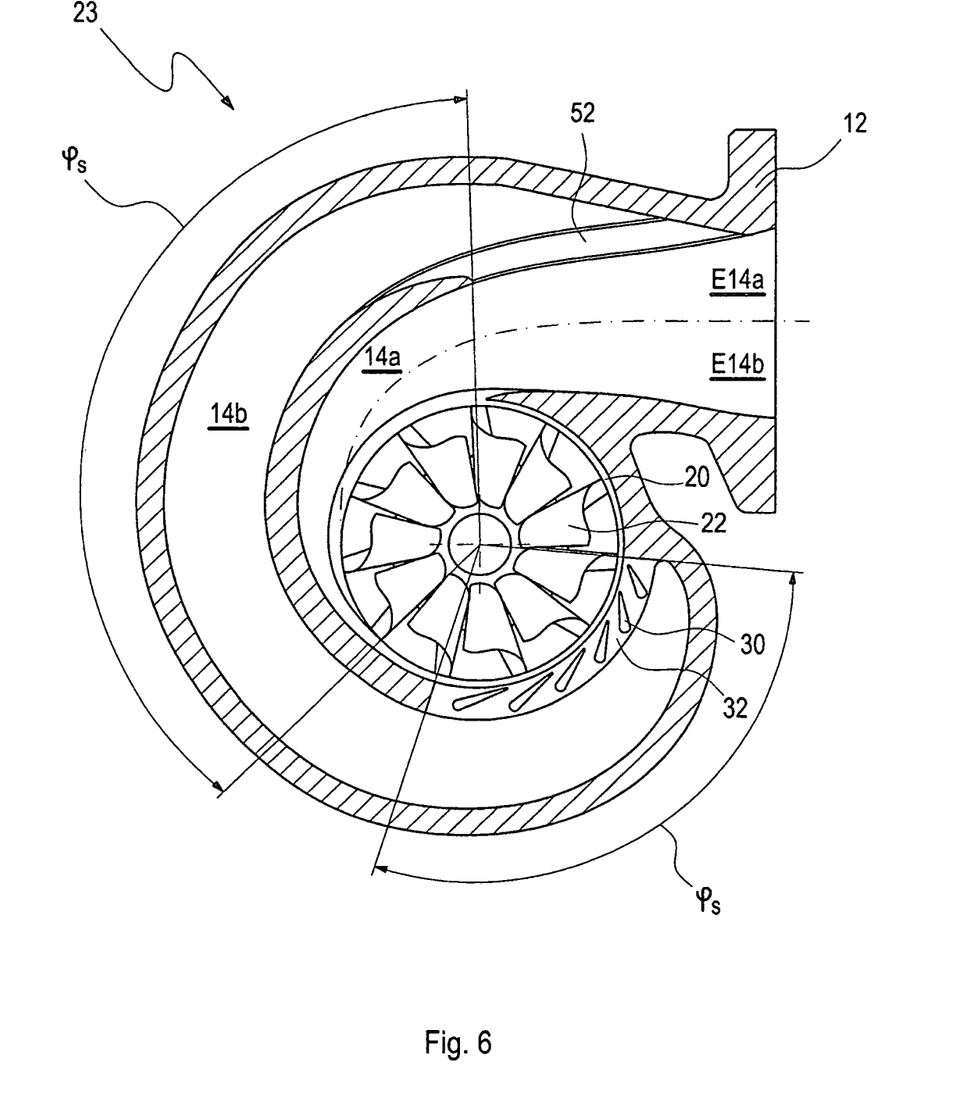
FIG. 6 is a cross-sectional view of the turbocharger according to a further embodiment, wherein an inlet region of the first spiral passage corresponds to an inlet region of the second spiral passage.

In a further embodiment of the turbocharger according to FIG. 6, the second spiral passage 14b extends radially around the first spiral passage 14a. A first inlet region E14a of the first spiral passage 14a corresponds to a second inlet region E14b of the second spiral passage 14b. An annular transitional region 52 from the first inlet region E14a or the second inlet region E14b to the second spiral passage 14b may be designed in different ways. In the illustrated embodiment, the annular transitional region 52 is completely open to flow. In an embodiment not illustrated in detail, the transitional region 52 has a plurality of flow openings in the form of slots. Alternatively, the transitional region 52 could be provided with circular openings. Any of these flow openings may be provided in the transitional region 52, depending on the application of the turbocharger. The flow opening of the annular transitional region 52 could be designed to be adjustable.

The first guide grid element 30 is placed between an end of the second spiral passage 14b which faces the turbine wheel 22 and the rotor chamber 20. In the illustrated embodiment, the first guide grid element 30 is stationary. To adjust the blade height and thus the banking behavior, the matrix 32 is mounted for axial movement in the turbine housing 12. In an embodiment not shown in detail, the guide grid element 30 has the shape of known adjustable guide vanes. The positioning of the matrix 32 or the adjustment of the adjustable guide vanes of the guide grid element 30 is controlled by the control unit 50. (FIG. 7)

Figure 7:
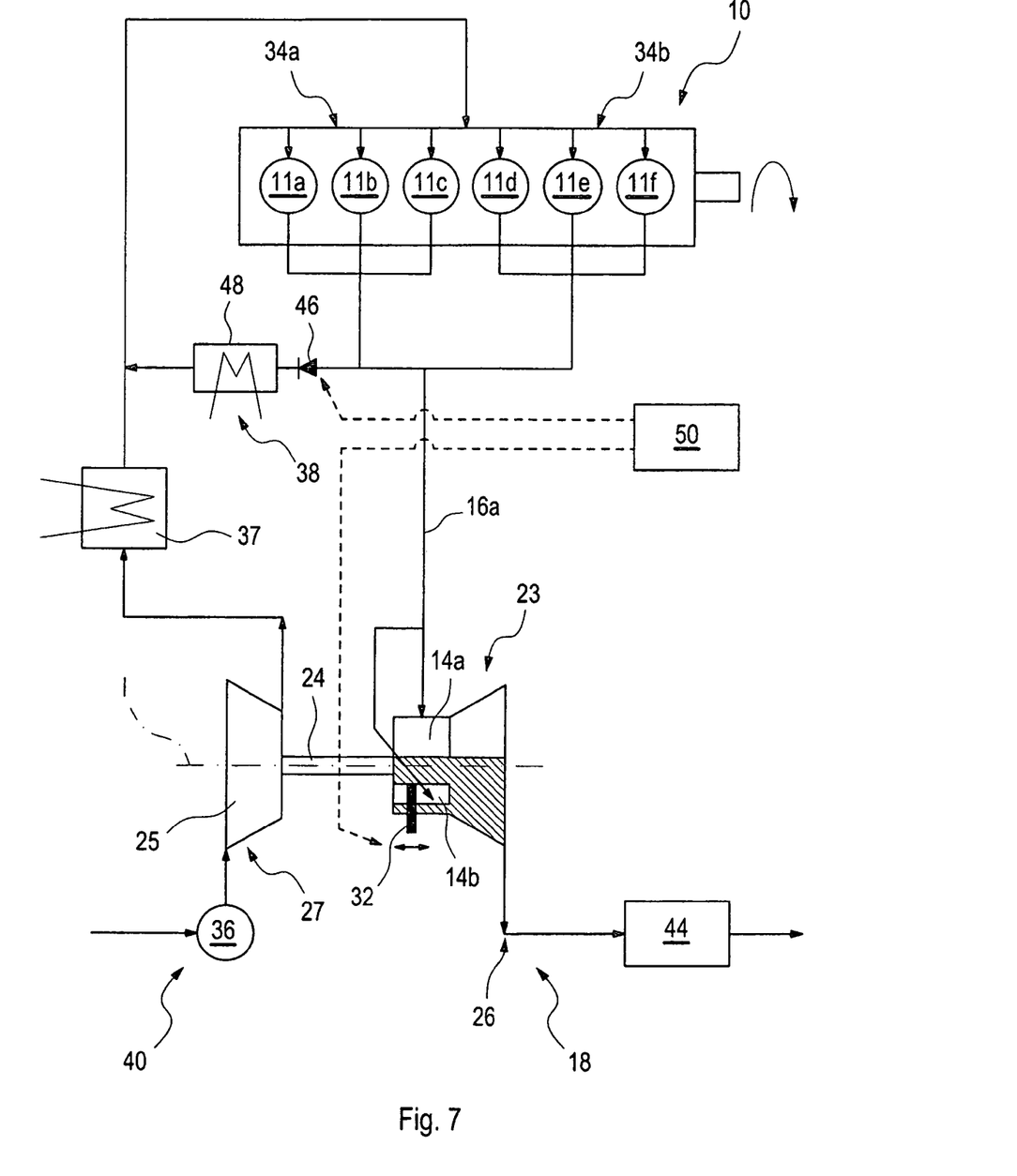
FIG. 7 is a schematic representation of an internal combustion engine fitted with the turbocharger according to the embodiment shown in FIG. 6.

According to FIG. 7, the internal combustion engine 10 comprises an exhaust gas line 16a which is connected to the first inlet region E14a or the second inlet region 14b respectively. The approach to the turbine wheel 22 can be varied with the aid of the matrix 32. Depending on the positioning of the matrix 32, flow can reach the turbine wheel 22 either exclusively via the first spiral passage 14a or both via the first spiral passage 14a and via the second spiral passage 14b. If the flow reaches the turbine wheel 22 via both spiral passages 14a, 14b, a stronger or weaker flow can be admitted to the turbine wheel 22 via the second spiral passage 14b, depending on the positioning of the matrix 32.

Figure 8:
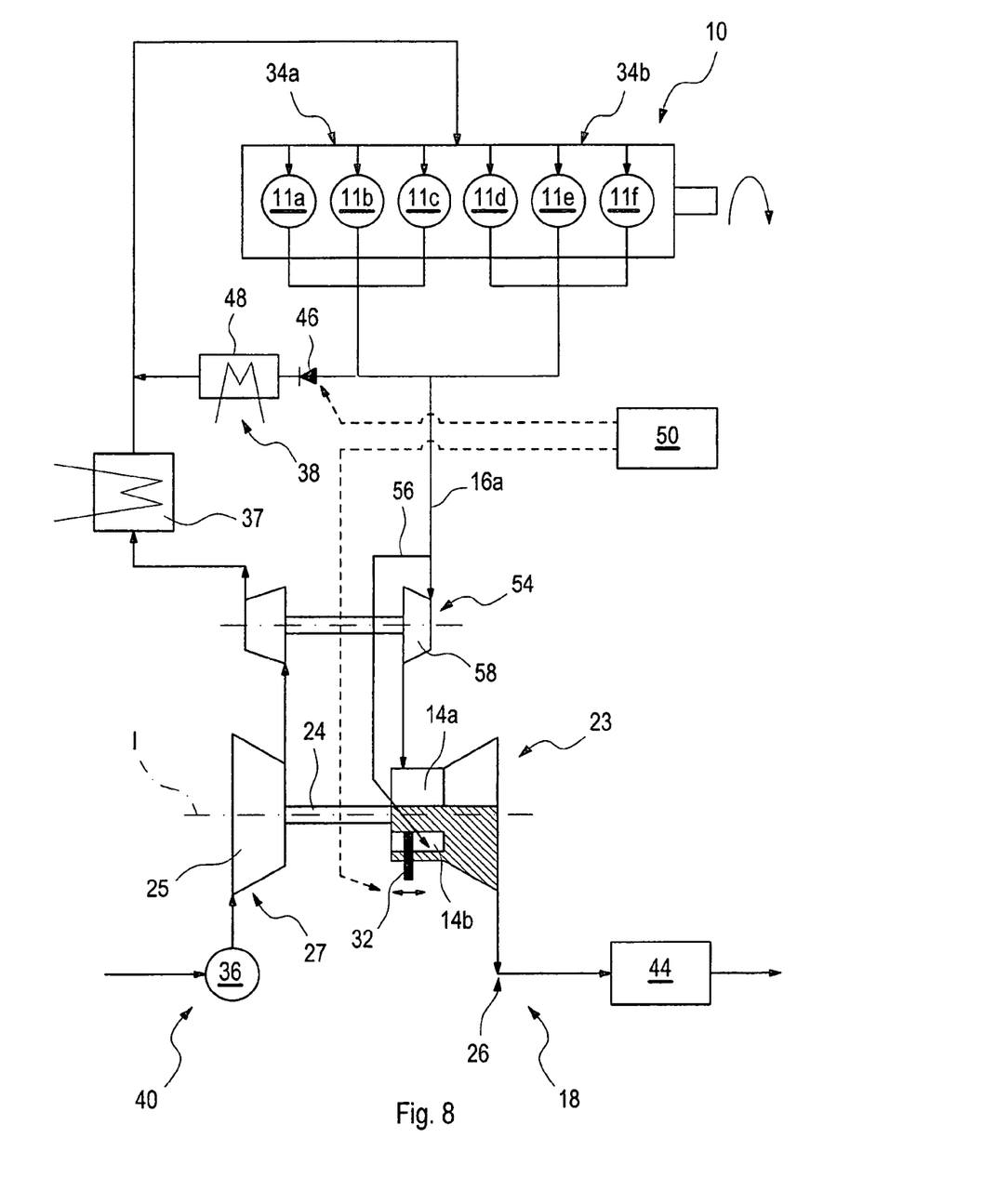
FIG. 8 is a schematic representation of an internal combustion engine fitted with the turbocharger according to the embodiment shown to FIG. 6 and with a further turbocharger of a 2-stage arrangement.

In an embodiment of the internal combustion engine 10 according to FIG. 8, a second turbocharger 54 is assigned to the internal combustion engine 10, wherein exhaust gas can be routed into the first inlet region E14a or the second inlet region 14b past a second turbine 58 of the second turbocharger 54 via a bypass passage 56. The exhaust gas volume to be routed past the second turbine 58 is adjustable by means of the matrix 32.

Figure 9:
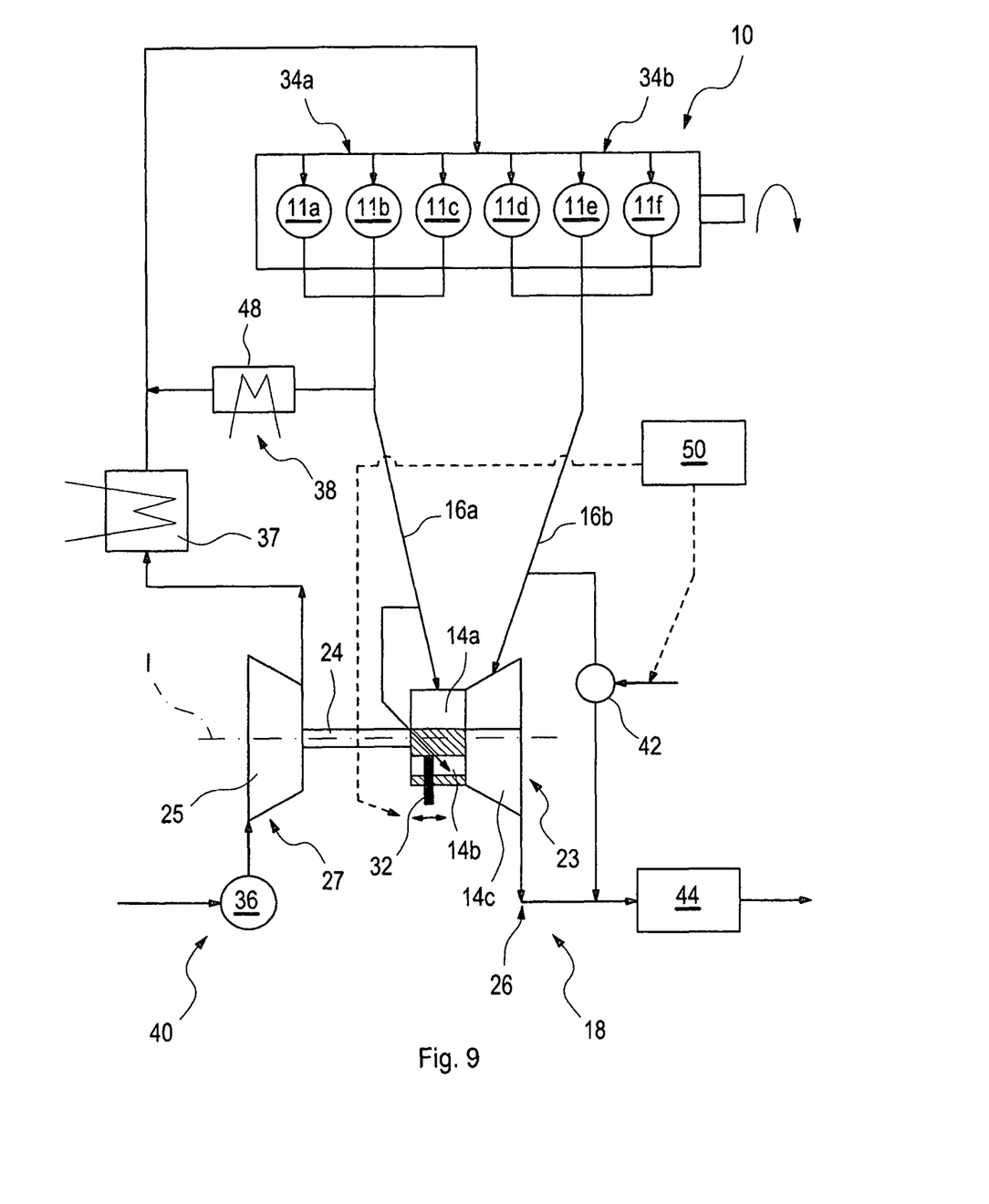
FIG. 9 is a schematic representation of an internal combustion engine fitted with a turbocharger having three spiral passages.

In a variant of the turbine 23 of the embodiment according to FIG. 6, the turbocharger comprises a third spiral passage 14c, the third spiral passage 14c being located adjacent to the first spiral passage 14a and the second spiral passage 14b. The third spiral passage 14c is designed in the known way and has a wrap angle $\phi_S$ corresponding to that of a full volute. According to FIG. 9, the third spiral passage 14c is coupled to the second exhaust gas line 16b. The first exhaust gas line 16a, which is not coupled to the blow-off device 42, is connected to the first spiral passage 14a or the second spiral passage 14b. In this embodiment, the exhaust gas recirculation valve 46 of the exhaust gas recirculation system 38 can be omitted, as the pressure in the exhaust gas recirculation system 38 can be controlled by means of the guide grid element 30 of the second spiral passage 14b. In the lower load range of the internal combustion engine 10, for example, the first guide grid element 30 is completely accommodated in the matrix 32 to obtain a maximum possible banking pressure at the cylinders of the cylinder group 34a, so that no exhaust gas can flow to the turbine wheel 22 from the second spiral passage 14b.

Figure 10:
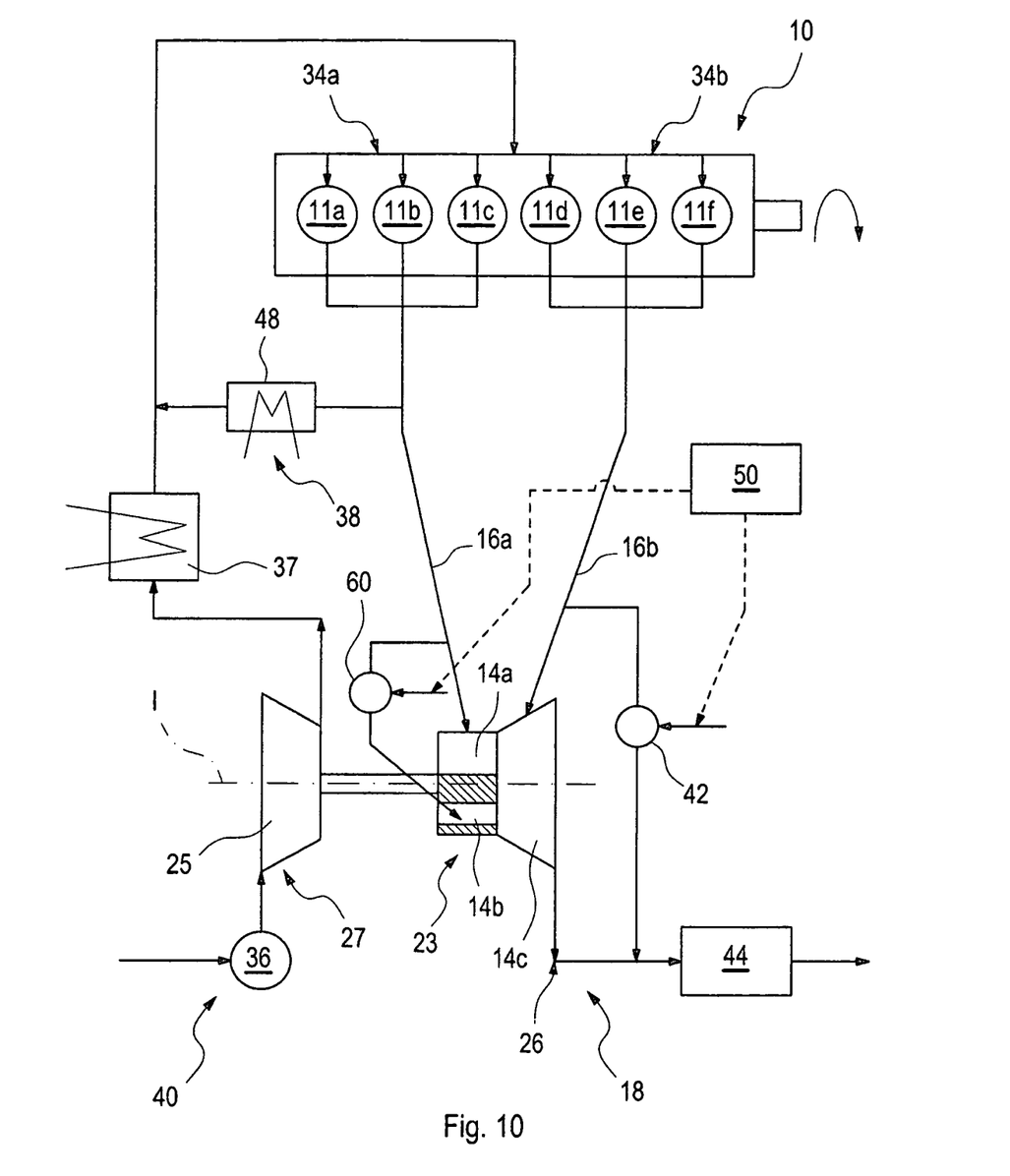
FIG. 10 is a schematic representation of another internal combustion engine fitted with a turbocharger having three spiral passages in a further embodiment.

In a further variant according to FIG. 10, the exhaust gas flowing through the second spiral passage 14b is adjusted via a control valve 60 positioned in a region of the second spiral passage 14b.

What is claimed is:

1. A turbocharger for an internal combustion engine (10) of a motor vehicle, comprising a turbine housing (12) having at least one first and one second spiral inlet passage (14a, 14b), each of which can be coupled to at least one of several exhaust gas lines (16a, 16b) of an exhaust train (18) of the internal combustion engine (10), and through each of which exhaust gas can flow independently, and further comprising a turbine wheel (22) located within a rotor chamber (20) of the turbine housing (12), which is provided for driving a compressor impeller (25) coupled to the turbine wheel (22) for rotation therewith via a support shaft (24), wherein the exhaust gas of the internal combustion engine, which can be routed through the at least two spiral passages (14a, 14b), can be admitted to the turbine wheel (22), the first and second spiral passages (14a, 14b) having different wrap angles ($\phi$s) around the turbine wheel (22) at least one of the first and the second spiral passages (14a, 14b) comprising in the region leading to the rotor chamber (20) a nozzle (28a, 28b) with an effective cross-section ($A_D$) chosen according to the formula $$A_D = r_D * 2 * \pi * b_D * \sin(\alpha_D) * (\phi_S/360),$$

wherein:

$A_D$ denotes the effective cross-section of the nozzle (28a);

$r_D$ a radius of the nozzle (28a) with respect to an axis of rotation (I) of the turbine wheel (22);

$b_D$ the cross-sectional width of the nozzle (28a);

$\alpha_D$ an angle between a circumferential speed vector and a radial speed vector of the exhaust gas flow in the cross-section of the nozzle (28a); and $\phi_s$ the wrap angle of the respective spiral passage (14a).

2. The turbocharger according to claim 1, wherein the first spiral passage (14a) has a wrap angle ($\phi_s$) of less than 300°.

3. The turbocharger according to claim 2, wherein the second spiral passage (14b) has a wrap angle ($\phi_s$) of at least 280°.

4. The turbocharger according to claim 3, wherein the first spiral passage (14a) is located in the region of a shaft bearing (24) of the turbocharger and the second spiral passage (14b) is located in the region of an exhaust gas outlet (26) of the turbine housing (12).

5. The turbocharger according to claim 1, wherein the cross-sectional width ($b_D$) of the nozzle (28a) is chosen in dependence on a limit width defined by production engineering considerations.

6. The turbocharger according to claim 1, wherein an inlet region (E14a) of the first spiral passage (14a) corresponds to an inlet region (E14b) of the second spiral passage (14b).

7. The turbocharger according to claim 6, wherein the turbine housing (12) comprises a third spiral passage (14c) located adjacent to the first spiral passage (14a) and the second spiral passage (14b), the wrap angle ($\phi_s$) of the third spiral passage (14c) corresponding to the wrap angle ($\phi_s$) of a full volute.

8. The turbocharger according to claim 1, wherein a guide grid element (30, 30') with guide vanes is provided in the region of at least one of the first and the second spiral passage (14a, 14b) which leads into the rotor chamber (20).

9. The turbocharger according to claim 8, wherein the guide grid element (30) is mounted movably in the turbine housing (12).

10. The turbocharger according to claim 8, wherein a matrix (32) for the adjustment of a blade height of the guide grid element (30) is mounted movably in the turbine housing (12).

11. The turbocharger according to claim 1, wherein a blow-off valve (42) is provided upstream of the turbine wheel (22) for guiding the exhaust gas past the turbine wheel (22).

12. An internal combustion engine (10) for a motor vehicle, comprising at least two cylinders (11a-f) or two cylinder groups (34a, 34b) to which are assigned at least two exhaust gas lines (16a, 16b), and further comprising a turbocharger with a compressor (27) located in an intake train (40) of the internal combustion engine (10) and a turbine (23) located in a exhaust train (18) of the internal combustion engine (10), wherein the turbine (23) comprises a turbine housing (12) with at least one first and one second spiral passage (14a, 14b), each of which is coupled to at least one of the two exhaust gas lines (16a, 16b) of the exhaust train (18) and through each of which exhaust gas can flow independently, and with a turbine wheel (22) located within a locating chamber (20) of the turbine housing (12), to which the exhaust gas of the internal combustion engine (10), which can be routed through the first and second spiral passages (14a, 14b), can be admitted to drive a compressor impeller (25) of the compressor (27) which is coupled thereto for rotation therewith via a drive shaft (24), the first and second spiral passages (14a, 14b) having different wrap angles ($\phi_s$) the first and the second spiral passages (14a, 14b) comprising in the region leading to the rotor chamber (20) nozzles (28a, 28b) with effective cross-sections ($A_D$) chosen according to the formula $$A_D = r_D * 2 * \pi * b_D * \sin(\alpha_D) * (\phi_S/360),$$

wherein:

$A_D$ denotes the effective cross-section of the respective nozzle (28a, 28b);

$r_D$ a radius of the respective nozzle (28a, 28b) with respect to an axis of rotation (I) of the turbine wheel (22);

$b_D$ the cross-sectional width of the respective nozzle (28a, 28b);

$\alpha_D$ an angle between a circumferential speed vector and a radial speed vector of the exhaust gas flow in the cross-section of the respective nozzle (28a, 28b); and $\phi_s$ the wrap angle of the respective spiral passage (14a, 14b).

13. The internal combustion engine according to claim 12, wherein an exhaust gas recirculation system (38) is provided in the exhaust train (18) upstream of the turbine (23), by means of which at least a part of the exhaust gas from at least one of the exhaust gas lines (16a) can be recirculated to the intake train (40).

14. The internal combustion engine according to claim 12, wherein an exhaust treatment system (44), including at least one of a particulate filter, a catalytic converter and an SCR system, is provided in the exhaust train (18) downstream of an exhaust gas outlet (26) of the turbine housing (12).

* * * * *

UNITED STATES PATENT AND TRADEMARK OFFICE
CERTIFICATE OF CORRECTION

PATENT NO. : 8,621,863 B2  
APPLICATION NO. : 12/925546  
DATED : January 7, 2014  
INVENTOR(S) : Krätschmer et al.

Page 1 of 1

It is certified that error appears in the above-identified patent and that said Letters Patent is hereby corrected as shown below:

Title page, item (12) and (75), delete "Krätschrner" and insert -- Krätschmer --.

Signed and Sealed this  
Fifteenth Day of April, 2014

Michelle K. Lee  
*Deputy Director of the United States Patent and Trademark Office*